United States Patent
Mistry et al.

(10) Patent No.: US 10,051,506 B1
(45) Date of Patent: Aug. 14, 2018

(54) TRAFFIC MANAGEMENT IN WIRELESS NETWORKS

(71) Applicant: Sprint Spectrum LP, Overland Park, KS (US)

(72) Inventors: Hetal Mistry, Ashburn, VA (US); Hui-Lin Chang, Ashburn, VA (US); Rashmi Kumar, Herndon, VA (US); James Paine, Centreville, VA (US); Cliff Grimes, Belton, MO (US); Ajay Patel, Frederick, MD (US)

(73) Assignee: Sprint Spectrum L.P., Overland Park, KS (US)

( * ) Notice: Subject to any disclaimer, the term of this patent is extended or adjusted under 35 U.S.C. 154(b) by 173 days.

(21) Appl. No.: 14/970,856

(22) Filed: Dec. 16, 2015

(51) Int. Cl.
*H04W 28/02* (2009.01)
*H04W 28/08* (2009.01)

(52) U.S. Cl.
CPC ... *H04W 28/0215* (2013.01); *H04W 28/0226* (2013.01); *H04W 28/08* (2013.01)

(58) Field of Classification Search
None
See application file for complete search history.

(56) References Cited

U.S. PATENT DOCUMENTS

| | | | |
|---|---|---|---|
| 8,856,301 B2 | 10/2014 | Kruglick | |
| 2010/0315950 A1* | 12/2010 | Venkataraman | H04L 43/0882 370/235 |
| 2012/0083281 A1* | 4/2012 | Watanabe | H04W 24/02 455/446 |
| 2012/0129517 A1* | 5/2012 | Fox | H04L 41/5025 455/425 |
| 2013/0114624 A1* | 5/2013 | Wang | H04L 67/22 370/468 |

* cited by examiner

*Primary Examiner* — Andrew Lai
*Assistant Examiner* — Sumitra Ganguly

(57) ABSTRACT

Embodiments disclosed herein describe systems, methods, and processing nodes for traffic management in wireless networks based on performing correlations between radio network attributes and wireless device attributes, and generating updated network parameters based on the correlation. Correlations between radio network attributes and wireless device attributes can yield commonalities or patterns based on a frequency band, a site, or a market. Based on the commonalities or patterns, network parameters such as cell reselection priority, allocation of resources, maximum traffic per frequency band, etc. can be calculated and deployed to various network elements such as control nodes, access nodes, wireless devices, etc. The deployment results in an optimal traffic distribution across each frequency band, such that the available spectrum is utilized efficiently and per-user throughput is maximized for all users of the wireless network.

20 Claims, 4 Drawing Sheets

TRAFFIC MANAGEMENT IN WIRELESS NETWORKS

TECHNICAL BACKGROUND

As wireless networks evolve and grow, there are ongoing challenges in determining an optimal traffic distribution across various sub-systems of a wireless network. For instance, a network may be configured to include various types of access nodes that use multiple frequency bands and have different coverage areas. Wireless devices with different access capabilities and usage requirements result in sub-optimal traffic patterns for different access nodes. This problem is further compounded when the radio access networks are built and deployed in phases, and as new frequency bands are gradually introduced into the network. Current methods for load balancing between frequency bands are inefficient, particularly as wireless devices with varying capabilities are released into the market on an ongoing basis.

Overview

Exemplary embodiments described herein include systems, methods, and nodes for traffic management in wireless networks. For instance, a method for traffic management in a wireless network comprises obtaining radio network attributes of one or more of a plurality of nodes within the wireless network and obtaining device attributes of one or more of a plurality of wireless devices served by said one or more of the plurality of nodes. A compatibility metric is determined based on a correlation of the device attributes and the radio network attributes. Traffic management operations are performed based on the compatibility metric.

A system for traffic management in a wireless network comprises a radio network including a plurality of nodes, wherein at least one of the plurality of nodes comprises a processor and computer-readable memory to store instructions that are executed by the processor to perform operations. The operations include determining a compatibility metric based on a correlation of a plurality of radio network attributes of one or more of the plurality of nodes and a plurality of device attributes of one or more of a plurality of wireless devices accessing services from the radio network. The operations further include determining an adjustment to a network load based on a correlation of the plurality of radio network attributes and the plurality of device attributes.

A processing node for managing traffic within a wireless network can include a processor and a memory communicatively coupled to the processor, the memory to store computer-readable instructions that can be executed by the processor. Operations performed by the processor include receiving a plurality of network characteristics from one or more sources, the plurality of network characteristics including at least a radiofrequency (RF) coverage characteristic, a wireless device characteristic, and a spectrum characteristic. A usage priority may be determined for a plurality of bands deployed by the wireless network based in part on the RF coverage characteristic and the wireless device characteristic. A band-wise traffic limit may be determined for the plurality of bands based in part on the spectrum characteristic. A plurality of network parameters are adjusted based on the usage priority and the band-wise traffic limit. The plurality of network parameters are implemented within the wireless network to equalize a load among one or more access nodes in the wireless network.

DETAILED DESCRIPTION

The embodiments disclosed herein describe novel systems, methods, and processing nodes for traffic management in wireless networks based on performing correlations between radio network attributes and wireless device attributes, and generating updated network parameters based on the correlation. Correlations between radio network attributes and wireless device attributes can yield commonalities or patterns such as common frequency band capabilities of access nodes (that deploy the common frequency band) and wireless device capabilities (to access the common frequency band), wireless device location and distribution among access nodes having coverage in said location, available channel bandwidth and sector capacity correlated with wireless device usage, etc. Correlation may be based on distributions of devices and frequency bands by market and by site. Based on the commonalities or patterns, network parameters such as cell reselection priority, allocation of resources, maximum traffic per frequency band, etc. can be calculated and deployed to various network elements such as control nodes, access nodes, wireless devices, etc. The deployment results in an optimal traffic distribution across each frequency band, such that the available spectrum is utilized efficiently and per-user throughput is maximized for all users of the wireless network.

Figure 1:
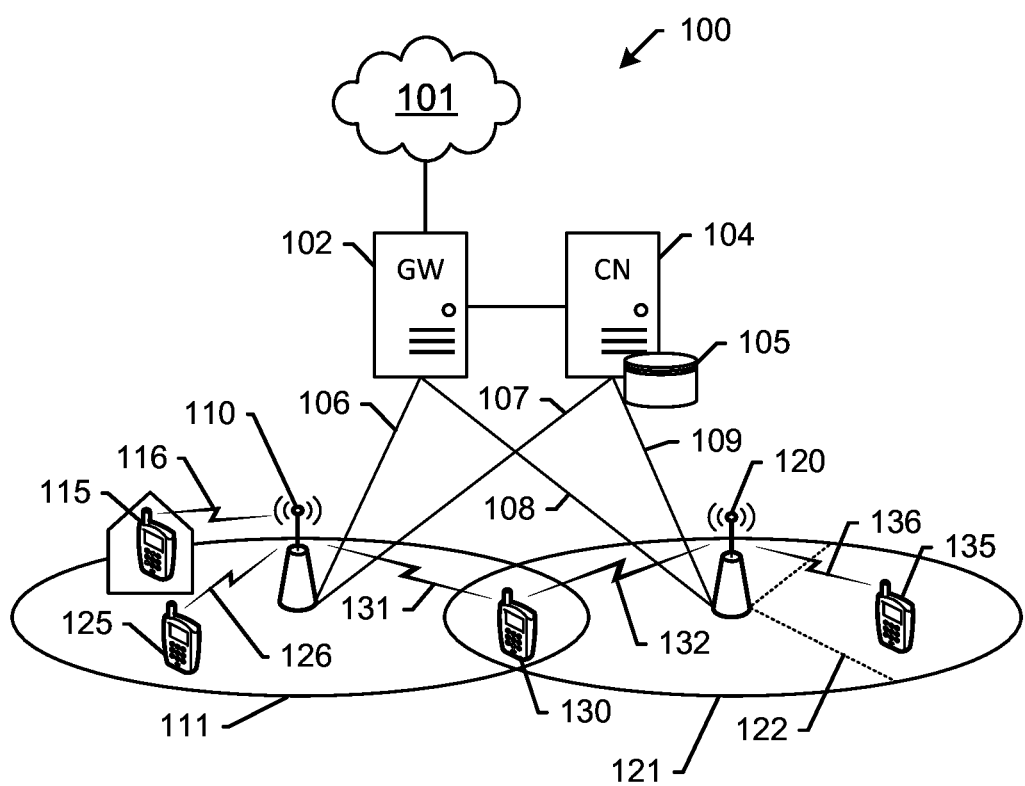
FIG. 1 depicts an exemplary system for traffic management in a wireless network.

FIG. 1 depicts an exemplary system 100 for traffic management in a wireless network. System 100 can comprise a communication network 101, gateway node 102 and controller node 104, access nodes 110 and 120 connected to gateway node 102 and controller node 104 via communication links 106, 107, 108, 109, with gateway node 102 providing access to a communication network 101, and access nodes 110, 120 providing wireless service to wireless devices 115, 125, 130, and 135. Other network elements may be present in system 100 to facilitate communication but are omitted for clarity, such as base stations, base station controllers, mobile switching centers, dispatch application processors, and location registers such as a home location register or visitor location register. Furthermore, other network elements may be present to facilitate communication, such as between access nodes 110, 120 and communication network 101 that are omitted for clarity, including additional processing nodes, routers, gateways, and physical and/or wireless data links for carrying data among the various network elements.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 115, 125, 130, 135. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107, 108, 109 can use various communication media, such as air, space, metal, optical fiber, or some other signal propagation path—including combinations thereof. Communication links 106, 107, 108, 109 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communications links 106, 107, 108, 109 may include S1 communications links. Other wireless protocols can also be used. Communication links 106, 107, 108, 109 can be a direct link or might include various equipment, intermediate components, systems, and networks. Communication links 106, 107, 108, 109 may comprise many different signals sharing the same link Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing wireless device parameters such as usage records, wireless device characteristics, etc., as well as radio network attributes, such as point-of-presence (POP) distribution, etc., as further described herein. The software comprises computer programs, firmware, or some other form of machine-readable instructions, and may include an operating system, utilities, drivers, network interfaces, applications, or some other type of software, and combinations thereof. Controller node 107 can receive instructions and other input at a user interface.

Access nodes 110, 120 can be any network nodes configured to provide communication between wireless devices 115, 125, 130, 135 and communication network 101. Access nodes 110, 120 can be standard access nodes and/or short range, low power, small access nodes. A standard access node can be a macrocell access node such as a base transceiver station, a radio base station, an eNodeB device, or an enhanced eNodeB device, or the like. In an exemplary embodiment, a macrocell access node such as access node 110 or 120 can have a coverage area 111 or 121 in the range of approximately five kilometers to thirty five kilometers and an output power in the tens of watts. A small access node can include a microcell access node, a picocell access node, a femtocell access node, or the like such as a home NodeB or a home eNodeB device. In an exemplary embodiment, a microcell access node can have a coverage area of approximately two kilometers and an output power of a few watts. In another exemplary embodiment, a picocell access node can have a coverage area of approximately a half a kilometer and an output power of less than one watt. In yet another exemplary embodiment, a femtocell access node can have a coverage area in the range of 50-200 meters and an output power in the range of 0.5 to 1 watt. Femtocell access nodes can be cellular access nodes or WiFi access nodes. In addition, a wireless device configured to enter a hotspot mode can be a femtocell access node. Moreover, it is noted that while access nodes 110, 120 are illustrated in FIG. 1, any number of access nodes can be implemented within system 100.

Access nodes 110, 120 can comprise a processor and associated circuitry to execute or direct the execution of computer-readable instructions to obtain information. Access nodes 110, 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 110, 120 can receive instructions and other input at a user interface. Access nodes 110, 120 communicate with gateway node 102 and controller node 104 via communication links 106, 107, 108, 109. Further, access nodes 110, 120 may communicate with each other wirelessly or via a wired link such as an X2 link (not shown).

Wireless devices 115, 125, 130, 135 may be any device, system, combination of devices, or other such communication platform capable of communicating wirelessly with access nodes 110, 120 using one or more frequency bands deployed by one or more of access nodes 110, 120. Wireless devices 115, 125, 130, 135 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 110, 120. Other types of communication platforms are possible.

Access nodes 110, 120 may each deploy one or more frequency bands. For example, access nodes 110, 120 may deploy an 800 MHz frequency band, a 1.9 GHz frequency band, and a 2.5 GHz frequency band, in any combination. A sector 122 of access node 120 may deploy a first frequency band, and another sector may deploy another frequency band. Therefore, two or more frequency bands may be deployed by a single access node. Other combinations of access nodes and frequency bands are possible, and may be within the purview of those having ordinary skill in the art at the time of this disclosure. In the present embodiment, access node 110 is serving at least wireless devices 115 and 125 via wireless links 116 and 126, respectively. Similarly, access node 120 is serving at least wireless device 135 in sector 122 via wireless link 136. Wireless device 130 is within range 111 of access node 110 and range 121 of access node 120, and therefore may be served by either access node 110 or 120, either via wireless links 131 or 132, respectively.

As described herein, traffic management may be performed based on correlations between radio network attributes and wireless device attributes. One example of radio network attributes include points-of-presence (POPs) for each frequency band, or site counts across each frequency band. For example, if access node 110 deploys only one frequency band, and access node 120 deploys the same frequency band as access node 110, and an additional frequency band such as in sector 122, then the presence and location of each access node 110, 120 is used as input into a correlation determination operation, in association with the specific frequency band. In another example, a correlation may be determined with a location and receive signal quality of wireless devices 115, 125 and a coverage area of access node 110, such that a coverage and signal quality of wireless device 115 (within a building) and wireless device 125 (located nearby but outside the building) is also used as an input into the correlation. It should be noted that wireless devices 115, 125 are represented as single devices, but may include several devices, thereby enabling a percentage distribution of devices that have indoor coverage versus outdoor coverage for a certain access node or sector thereof to be correlated. Similarly, a distribution of devices across different frequency bands deployed by access nodes 110, 120 may be input into the correlation.

For example, a wireless device property may include a capability of wireless device 130 to access bands deployed by both access nodes 110 and 120, and a wireless device property of wireless device 135 may indicate that wireless device 135 is capable of accessing only a single frequency band deployed in sector 122. Therefore, a percentage distribution of devices with different capabilities, such as single-band, dual-band, tri-band, etc. may be correlated with the presence and distribution of access nodes serving said frequency bands. Further, a number of carriers per access node or per frequency band may be identified and correlated with the distribution of devices. An available bandwidth for each carrier in each frequency band may vary, for example among 5 MHz, 10 Mhz, or 20 MHz, and a channel bandwidth may be correlated with a technology type of the carrier to determine an average throughput supported for a single wireless device. A frequency-division-duplexing carrier may have a different throughput from a time-division-duplexing carrier. These radio network attributes from access nodes and radiofrequency (RF) network may be correlated with a device usage or application usage, and may be correlated with a time of day with highest peak usage, so as to determine a "sector capacity". This enables a determination of maximum traffic that may be carried on each band.

Thus, correlations between radio network attributes and wireless device attributes can yield commonalities or patterns such as common frequency band capabilities of access nodes (that deploy the common frequency band) and wireless device capabilities (to access the common frequency band), wireless device location and distribution among access nodes having coverage in said location, available channel bandwidth and sector capacity correlated with wireless device usage, etc. The wireless device attributes and radio network attributes may be sourced from numerous network entities. For example, the wireless device capabilities may be retrieved from a customer database 105 or usage records stored on a network node, such as controller node 104, or another node such as a mobility management entity (MME) on network 100. Radio network attributes such as POPs per band, etc. may be sourced directly from network nodes 110, 120, for example via communication links 106, 107, 108, or 109. These and other radio network attributes may be stored on database 105, or may be retrieved from other entities on network 100.

Based on the commonalities or patterns, network parameters such as cell reselection priority, allocation of resources, maximum traffic per frequency band, etc. can be calculated. These network parameters may include a cell reselection priority for wireless devices 115, 125, 130, 135 directing them to access particular access nodes or frequency bands when available. A commonality determined during the correlation may further be used to determine an optimal pairing between a wireless device and an access node, such as wireless device 135 being paired with a specific band deployed in sector 122 of access node 120. Further, the network parameters can be refined with ongoing measurements of usage and signal quality from access nodes 110, 120 or wireless devices 115, 125, 130, 135. For example, applications may be executed on a wireless device for reporting usage and/or signal quality of one of wireless links 116, 126, 131, 132, 136. Moreover, data consumption may be monitored on an ongoing basis and used to pair high-usage devices with high-throughput sectors, and low-usage devices with low-throughput sectors. Moreover, the densities and locations of wireless devices 115, 125, 130, 135 can be dynamic, therefore resulting in ongoing adjustments to network parameters, such that traffic is optimally managed on an ongoing basis. The network parameters are deployed to various network elements such as control nodes, access nodes, wireless devices, etc. The deployment results in an optimal traffic distribution across each frequency band, such that the available spectrum is utilized efficiently and per-user throughput is maximized for all users of the wireless network.

Figure 2:
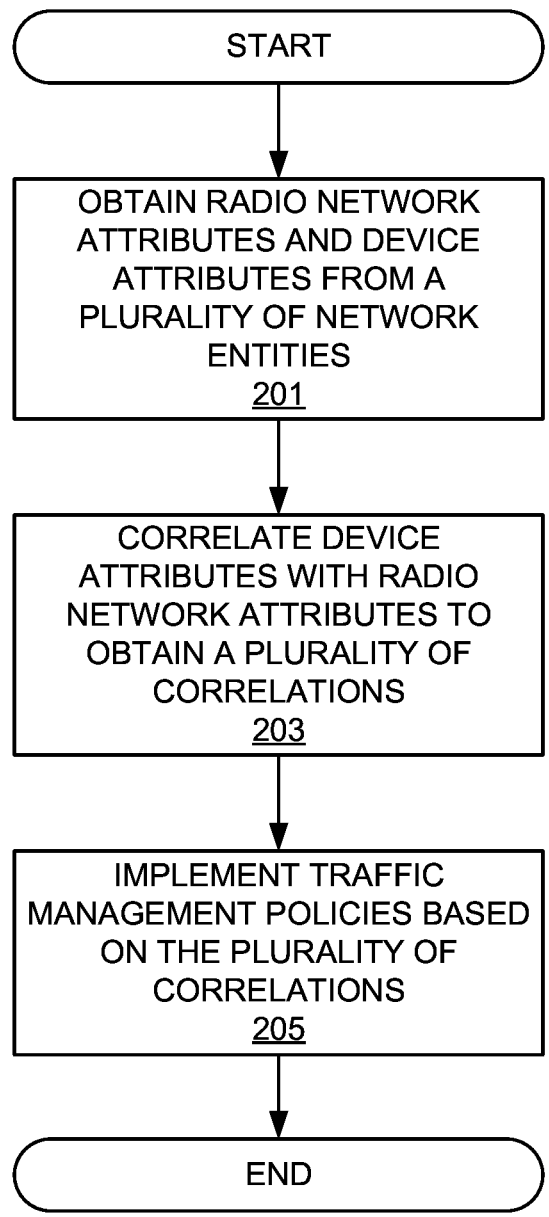
FIG. 2 depicts an exemplary method for traffic management in a wireless network.

FIG. 2 depicts an exemplary method for traffic management in a wireless network. The method will be discussed with reference to the exemplary communication system 100 illustrated in FIG. 1. However, the method can be implemented with any suitable communication system. In addition, although FIG. 2 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

In 201, radio network attributes and wireless device attributes are obtained from a plurality of network entities. Examples of radio network attributes include points-of-presence (POPs) for each frequency band, site counts across each frequency band, presence and location of each access node in the network, a coverage area of access nodes, a number of carriers per access node or per frequency band, a sector capacity representing a maximum traffic that may be carried on each band, etc. Examples of device attributes include a location and receive signal quality of wireless devices, a percentage distribution of devices that have indoor coverage versus outdoor coverage for a certain access node or sector thereof, a distribution of devices across different frequency bands, a capability of wireless devices to access bands deployed by access nodes, device usage or application usage, etc. The wireless device attributes and radio network attributes may be sourced from numerous network entities. For example, the wireless device capabilities may be retrieved from a customer database or usage records stored on an access node, a controller node, or another node such as a mobility management entity (MME) on a wireless network. Radio network attributes such as POPs per band, etc. may be sourced directly from access nodes, or may be retrieved from other entities on the network.

In 203, the network and wireless device attributes are correlated to find a plurality of correlations, such as commonalities or patterns between the attributes. For example, a common frequency band capabilities of access nodes (that deploy the common frequency band) and wireless device capabilities (to access the common frequency band), wireless device location and distribution among access nodes having coverage in said location, available channel bandwidth and sector capacity correlated with wireless device usage, etc. are among the correlations that can be used to determine network parameters for optimal traffic management. Based on the correlations, network parameters such as cell reselection priority, allocation of resources, maximum traffic per frequency band, etc. can be calculated. These network parameters may include a cell reselection priority for wireless devices, an optimal pairing between a wireless device and an access node, etc.

In one exemplary embodiment, indoor and outdoor POPs covered by band and by site, normalized against the most widely deployed band, are correlated with wireless device capability to access specific frequency bands, along with a distribution of wireless devices by market and by site, to obtain a traffic management model or priority of cell/band selection. Further, real-time indoor and outdoor usage from application-based measurement tools on the wireless devices, along with per-user data consumption per month for each device type (based on frequency band access capability) per market, may be correlated to fine-tune or refine the network parameters. Further, a number of RF carriers deployed for each frequency band, per market and site, along with a sector capacity for each band, is used to determine a band-wise traffic limit, and applied to the network parameters.

The resulting output is an estimated traffic distribution by band, by market, and by site, that is implemented in step 205 within the network. The network parameters are deployed to various network elements such as control nodes, access nodes, wireless devices, etc. The deployment results in an optimal traffic distribution across each frequency band, such that the available spectrum is utilized efficiently and per-user throughput is maximized for all users of the wireless network. Further, the network parameters can be refined with ongoing measurements of usage and signal quality from access nodes or wireless devices based on, for instance, applications executed on a wireless device for reporting usage and/or signal quality, and data consumption reported on an ongoing basis. As the densities and locations of the wireless devices can be dynamic, ongoing adjustments to network parameters are implemented such that traffic is optimally managed on an ongoing basis. The method can iteratively repeat such traffic management in real-time using measurements of each band, until the load is equalized and the congestion in all bands is resolved or minimized.

Figure 3:
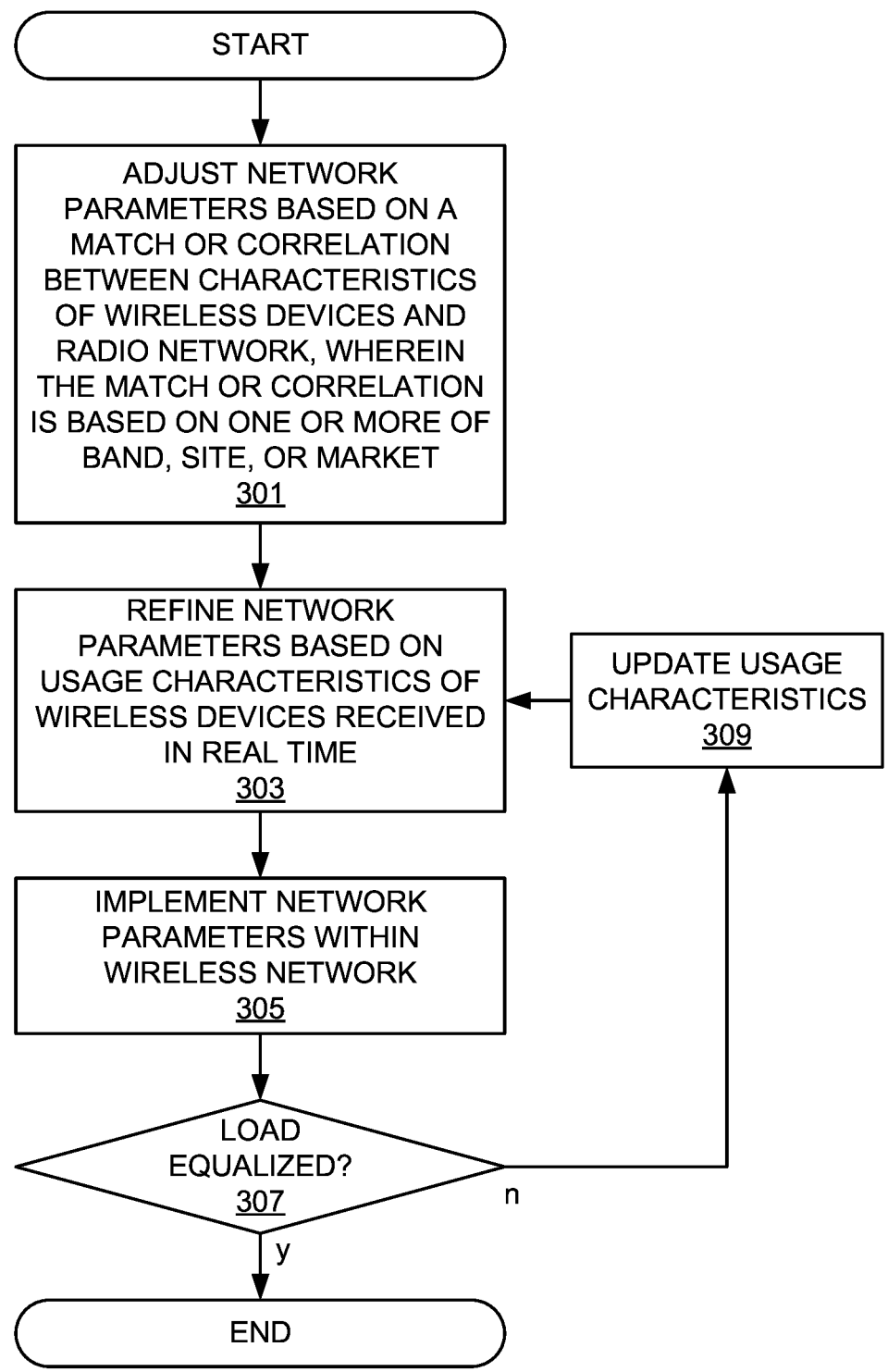
FIG. 3 depicts an exemplary method for adjusting network parameters in real time.

FIG. 3 depicts an exemplary method for adjusting radio network attributes in real time. The method will be discussed with reference to the exemplary communication system 100 illustrated in FIG. 1. However, the method can be implemented with any suitable communication system. In addition, although FIG. 3 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

In 301, a plurality of network parameters is adjusted based on a match or correlation between wireless device characteristics and network characteristics. A plurality of correlations, such as commonalities or patterns between the attributes may be determined based on a band, a site, or a market. For example, a common frequency band capabilities of access nodes (that deploy the common frequency band) and wireless device capabilities (to access the common frequency band), wireless device location and distribution among access nodes having coverage in said site location, available channel bandwidth and sector capacity correlated with wireless device usage, etc. are among the correlations that can be used to determine network parameters for optimal traffic management. Based on the correlations, network parameters such as cell reselection priority, allocation of resources, maximum traffic per frequency band, etc. can be calculated. These network parameters may include a cell reselection priority for wireless devices, an optimal pairing between a wireless device and an access node, etc.

In one exemplary embodiment, indoor and outdoor POPs covered by band and by site, normalized against the most widely deployed band, are correlated with wireless device capability to access specific frequency bands, along with a distribution of wireless devices by market and by site, to obtain a traffic management model or priority of cell/band selection. Further, real-time indoor and outdoor usage from application-based measurement tools on the wireless devices, along with per-user data consumption per month for each device type (based on frequency band access capability) per market, may be correlated to fine-tune or refine the network parameters. Further, a number of RF carriers deployed for each frequency band, per market and site, along with a sector capacity for each band, is used to determine a band-wise traffic limit, and applied to the network parameters.

In 303, the network parameters can be refined with ongoing measurements of usage and signal quality from access nodes or wireless devices based on, for instance, applications executed on a wireless device for reporting usage and/or signal quality, and data consumption reported on an ongoing basis and in real-time. Further, in 305, the network parameters are implemented within the network via, for instance, deployment to various network elements such as control nodes, access nodes, wireless devices, etc. The deployment results in an optimal traffic distribution across each frequency band, such that the available spectrum is utilized efficiently and per-user throughput is maximized for all users of the wireless network.

Moreover, the load may be monitored in step 307 to ensure that traffic management is optimized. If not, updated usage characteristics are retrieved in step 309, and network parameters refined 303. For instance, as the densities and locations of the wireless devices can be dynamic, ongoing adjustments to network parameters are made such that traffic is optimally managed on an ongoing basis. The loop in steps 303, 305, 307, and 309 can iteratively repeat in real-time using measurements of each band, until the load is equalized and the congestion in all bands is resolved or minimized. The resulting load is eventually balanced based on traffic being distributed by band, by market, and by site.

For example, when a new wireless device is added to a specific location (i.e. market), the incremental increase in the network load is measured at one or more access nodes that serve that market. Moreover, a wireless device capability or a band access capability, along with other wireless device characteristics, is also input into a customer database stored on the network. When a subsequent correlation is performed, a correlation of these additional wireless device characteristics with the existing/unchanged network characteristics may trigger a change in a network parameter. If the correlation occurs on a scheduled or continuous basis, the increased network load may surpass a threshold that triggers a load balancing or traffic management action performed by one or more network elements. For example, if the number of tri-band wireless devices within a market exceeds a threshold, the correlation may determine that additional frequency bands need to be deployed in that market, whereas previously, having fewer deployed bands may be more optimal. Similar actions may be performed when a wireless device is moved from one market to another, or when a wireless device switches bands. For example, a specific application used on the wireless device may be more suited to a different frequency band. A wireless device using a lower-frequency band may move indoors, and therefore be better served by a higher-frequency band having better penetration than the lower-frequency band. Given an identical market and band, adjustments may be made based on application usage. Similarly, given an identical application and market, adjustments may be made on band capability.

Each of these changes may be reflected in an ongoing correlation between average wireless device characteristics, such as a monthly-updated wireless device characteristic report. A correlation performed with the updated characteristics may trigger changes in the wireless network to adapt to the updates. The changes may be output in the form of suggested network parameters, such as deploying/shutting down frequency bands, changing a beamforming characteristic of a specific access node or set of access nodes, or adjusting any other network characteristic. For example, a higher-than-usual data transfer rate reported by a plurality of wireless devices within a sector may trigger increased power for the antennas serving that sector.

In one exemplary embodiment, with reference to system 100, access nodes 110, 120 can each deploy one or more frequency bands from among 800 MHz, 1.9 GHz, and 2.5 GHz. Further, each wireless device 115, 125, 130, 135 is generally provisioned with a cell reselection priority table, such that if the wireless device enters an idle state, it resumes from idle and connects with or "reselects" the highest-priority cell or frequency band. A priority list for cell reselection may be stored as a default priority list, depending on the requirements of the network operator. For instance, a 2.5 GHz band deployed by access node 110 may have the highest priority, as the network operator desires that more devices connect to this frequency band. Similarly, an 800 MHz band deployed by access node 120 may have the lowest priority for several reasons. A single access node may deploy more than one frequency band, and multiple access nodes may each deploy the same frequency band.

According to this embodiment, based on band congestion determined within one or more of access nodes 110, 120, a network parameter adjustment can include generating an updated cell-reselection priority list that assigns lower priority to a congested band relative to a non-congested band, and transmitting the updated cell-reselection priority list to one or more of wireless devices 115, 125, 130, 135. In other words, the default priority may be modified or adjusted based on real-time load conditions for each frequency band deployed by one or more of access nodes 110, 120, and transmitted individually to a wireless device based on the capabilities of the wireless device. When a congested band is detected, for example via physical resource block (PRB) utilization metrics, number of connected users, or any other load-determination technique, loads across the various bands may be compared with a load threshold, and the priority of each band adjusted accordingly. The load thresholds for each band may be stored in the priority list, and distributed across each access node 110, 120.

In the present embodiment, wireless device 130 is located within coverage area 111 of access node 110 and within coverage area 121 of access node 120, in an overlapping region between coverage areas 111 and 121. Thus, it can be understood that wireless device 131 is being served by a frequency band deployed by one of access nodes 110 or 120. Moreover, in some embodiments, wireless device 130 is provisioned with a cell reselection priority table, such that if wireless device 130 enters an idle state, it resumes from idle and connects with the highest-priority cell or frequency band. Other embodiments may provide for other methods for updating wireless device 130 with reselection priorities. A default priority may assign a relatively higher priority to a first frequency band deployed by, for example, access node 110, and a relatively lower priority to a second frequency band deployed by, for instance, access node 120. However, access node 110 may determine that the first frequency band is congested via, for instance, a plurality of signal measurements (i.e. network characteristics).

If wireless device 130 enters an idle state, it would resume and attempt to connect to the first frequency band, and thereby increase congestion in that frequency band. To avoid this scenario, access node 120 may adjust the priorities for each band in a priority table, and transmit the priority table to wireless device 130 as wireless device 130 enters an idle state. The priorities may be adjusted such that the first frequency band is assigned a priority that is relatively lower than a priority of the second frequency band. The adjusted priority table is transmitted to wireless device 130 as it enters an idle mode, for example, via idle-mode mobility control information (IMMCI) in an RRC_Release message. Therefore, when wireless device 130 attempts to resume a connection from idle mode, it is directed to access the non-congested second frequency band deployed by access node 120. This adjustment of a network parameter (i.e. cell reselection priority table) therefore results in an optimal traffic distribution across each frequency band, such that the available spectrum is utilized efficiently and per-user throughput is maximized for all users of the wireless network.

Figure 4:
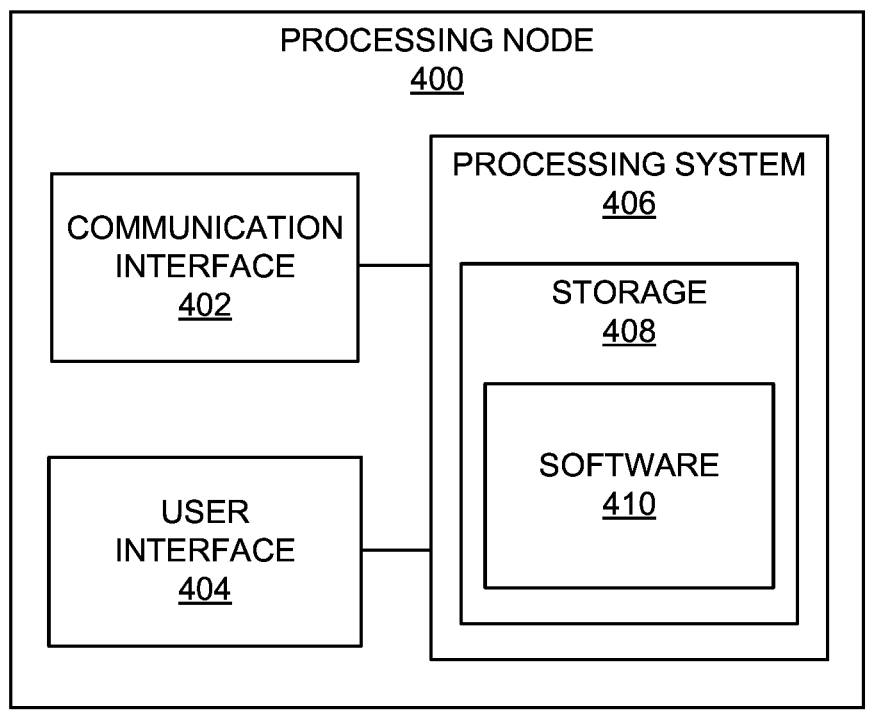
FIG. 4 depicts an exemplary processing node.

FIG. 4 depicts an exemplary processing node 400 comprising communication interface 402, user interface 404, and processing system 406 in communication with communication interface 402 and user interface 404. Processing node 400 is capable of paging a wireless device and communicating with access nodes via communication interface 402. Processing system 406 includes storage 408, which can comprise a disk drive, flash drive, memory circuitry, or other memory device. Storage 408 can store software 410 which is used in the operation of the processing node 400. Storage 408 may include a disk drive, flash drive, data storage circuitry, or some other memory apparatus. Software 410 may include computer programs, firmware, or some other form of machine-readable instructions, including an operating system, utilities, drivers, network interfaces, applications, or some other type of software. Processing system 406 may include a microprocessor and other circuitry to retrieve and execute software 410 from storage 408. Processing node 400 may further include other components such as a power management unit, a control interface unit, etc., which are omitted for clarity. Communication interface 402 permits processing node 400 to communicate with other network elements. User interface 404 permits the configuration and control of the operation of processing node 400.

An example of processing node 400 includes access nodes 110, or 120. Processing node 400 can also be an adjunct or component of a network element, such as an element of access nodes 110, 120, gateway 102, controller node 104, a mobility management entity, a proxy node, a wireless device or another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for traffic management in a wireless network, the method comprising:
   obtaining radio network attributes of one or more of a plurality of nodes within the wireless network, the radio network attributes including at least a radiofrequency (RF) coverage characteristic;
   obtaining device attributes of one or more of a plurality of wireless devices served by said one or more of the plurality of nodes;
   obtaining a spectrum characteristic of one or more RF bands deployed by the one or more of the plurality of nodes;
   determining a usage priority for the one or more RF bands based on a correlation of the device attributes and the RF coverage characteristic;
   determining a band-wise traffic limit for the one or more RF bands based in part on the spectrum characteristic; and
   adjusting a plurality of network parameters based on the usage priority and the band-wise traffic limit,
   wherein the plurality of network parameters are implemented within the wireless network to equalize a load among one or more access nodes from the plurality of nodes within the wireless network.

2. The method of claim 1, wherein the radio network attributes further comprise one or more of a location of a point-of-presence (POP), a radiofrequency (RF) band for the POP, a coverage type for each RF band, a number of carriers for each RF band, or a sector capacity for one or more access nodes from among the plurality of nodes within the wireless network.

3. The method of claim 2, wherein the device attributes comprise one or more of a location, an RF-band access capability, or a distribution of said one or more of the plurality of wireless devices.

4. The method of claim 3, wherein the usage priority is adjusted based on determining a match between the device attributes and the radio network attributes.

5. The method of claim 4, wherein the match is between one or more of: a common location of the POP and the wireless device, or a common RF band of the POP and the wireless device.

6. The method of claim 1, wherein determining the usage priority further comprises generating a preferred combination of each of the plurality of wireless devices with one or more access nodes from among the plurality of nodes.

7. The method of claim 6, wherein adjusting the plurality of network parameters further comprises assigning wireless devices to said one or more access nodes.

8. The method of claim 6, further comprising transmitting the preferred combination to a node from among the plurality of nodes.

9. The method of claim 1, further comprising receiving usage measurements from one or more wireless devices, and determining the usage priority based on the usage measurements.

10. The method of claim 9, further comprising determining the usage priority in real-time based on continuous receiving of the usage measurements.

11. The method of claim 1, further comprising determining the usage priority in real-time based on periodic obtaining of the one or more of the device attributes and the network attributes.

12. A processing node for managing traffic within a wireless network, the processing node comprising:
a processor; and
a memory communicatively coupled to the processor, the memory to store computer-readable instructions that are executed by the processor to perform operations comprising:
receiving a plurality of network characteristics from one or more sources, the plurality of network characteristics including at least a radiofrequency (RF) coverage characteristic, a wireless device characteristic, and a spectrum characteristic;
determining a usage priority for a plurality of bands deployed by the wireless network based in part on the RF coverage characteristic and the wireless device characteristic;
determining a band-wise traffic limit for the plurality of bands based in part on the spectrum characteristic; and
adjusting a plurality of network parameters based on the usage priority and the band-wise traffic limit,
wherein the plurality of network parameters are implemented within the wireless network to equalize a load among one or more access nodes in the wireless network.

13. The processing node of claim 12, wherein determining the usage priority is based on determining a match between the wireless device characteristic and the RF coverage characteristic.

14. The processing node of claim 13, wherein the match comprises one or more of a RF band, a site, or a market.

15. The processing node of claim 12, wherein determining the band-wise traffic limit for the plurality of bands further comprises determining a sector capacity based on an average throughput supported for a single wireless device at a specific time.

16. The processing node of claim 12, wherein the plurality of network parameters are implemented by transmitting the plurality of network parameters to said one or more access nodes.

17. A system for managing traffic within a wireless network, the system comprising:
a processor; and
a memory communicatively coupled to the processor, the memory to store computer-readable instructions that are executed by the processor to perform operations comprising:
receiving a plurality of network characteristics from one or more sources, the plurality of network characteristics including at least a radiofrequency (RF) coverage characteristic, a wireless device characteristic, and a spectrum characteristic;
determining a usage priority for a plurality of bands deployed by the wireless network based in part on the RF coverage characteristic and the wireless device characteristic;
determining a band-wise traffic limit for the plurality of bands based in part on the spectrum characteristic; and
adjusting a plurality of network parameters based on the usage priority and the band-wise traffic limit,
wherein the plurality of network parameters are implemented within the wireless network to equalize a load among one or more access nodes in the wireless network.

18. The system of claim 17, wherein determining the usage priority is based on determining a match between the wireless device characteristic and the RF coverage characteristic.

19. The system of claim 18, wherein the match comprises one or more of a RF band, a site, or a market.

20. The system of claim 17, wherein determining the band-wise traffic limit for the plurality of bands further comprises determining a sector capacity based on an average throughput supported for a single wireless device at a specific time.

* * * * *